United States Patent
Thompson et al.

[11] Patent Number: 5,809,108
[45] Date of Patent: Sep. 15, 1998

[54] AUTOMATED TEST CALL GENERATION AND EXECUTION SYSTEM

[75] Inventors: Ira A. Thompson; William R. Liese, both of Allen; Charlie C. Tsai, Plano; Scot Bartholomew, Allen, all of Tex.

[73] Assignee: MCI Communications Corporation, Washington, D.C.

[21] Appl. No.: 722,513

[22] Filed: Sep. 27, 1996

[51] Int. Cl.⁶ .............................. H04M 1/24; H04M 3/08; H04M 3/22; H04J 1/16
[52] U.S. Cl. ................................. 379/15; 379/10; 379/27; 379/34; 370/250
[58] Field of Search .................................. 379/1, 9–17, 32, 379/34, 207, 230, 22, 24, 27, 29; 370/242, 244, 250, 251, 252

[56] References Cited

U.S. PATENT DOCUMENTS

| | | | |
|---|---|---|---|
| 5,369,680 | 11/1994 | Borbas et al. | 379/9 |
| 5,390,232 | 2/1995 | Freeman et al. | 379/10 |
| 5,539,802 | 7/1996 | De Caluwe et al. | 379/13 |
| 5,608,789 | 3/1997 | Fisher et al. | 379/207 |
| 5,621,670 | 4/1997 | Maeda et al. | 379/11 |
| 5,633,909 | 5/1997 | Fitch | 379/10 |

*Primary Examiner*—Paul Loomis

[57] ABSTRACT

A test system and method that generates and executes test calls and verifies signaling for test calls using in-band, out-of-band and ISDN signaling. The test system captures signaling data from the origination and termination sides of test calls that use both in band, out-of-band and ISDN signaling techniques. The captured data is saved in a computer file and stored in a computer database for subsequent use. When the test case is subsequently executed, the captured data is retrieved from the database and used to verify signaling data by comparing the captured data from the test call with the previously captured data. The test case generator builds test calls by presenting to a user, a menu for each step in a test call. The user creates test calls by selecting list items and by entering keyboard data where appropriate. In this fashion, test calls are created without needing specialized knowledge of specific languages used by test call execution systems.

14 Claims, 8 Drawing Sheets

AUTOMATED TEST CALL GENERATION AND EXECUTION SYSTEM

BACKGROUND OF THE INVENTION

1. Field of the Invention

The present invention relates generally to telecommunication test systems and more specifically to an automated telecommunications test system that generates and executes test calls and verifies signaling for test calls using in-band, out-of-band and ISDN signaling.

2. Related Art

Testing signaling data for telecommunication networks can be a laborious and time consuming task. This is especially true in today's environment where a wide variety of new telecommunication services are being deployed on a rapid basis. Testing is typically performed at various stages throughout the development process when software and/or hardware changes are made to network elements. Typical test environments include a plurality of diverse telecommunication components such as transmission lines, call-switch facilities and digital cross-connects (DXCs) that are identical or equivalent to the network components forming the actual telecommunications network.

As new services are being developed, switch software is typically modified and refined on a frequent basis. The modifications are generally based on several factors, including marketing studies, customer feedback, design changes, other network element changes and the like. To implement such modifications during the development cycle, product development organizations modify the software which drives the various network elements used to support the new service. The modified software versions are then released to testing organizations who are responsible for verifying the functionality and performance of the new service.

Additionally testing is performed to make sure that the modified software does not adversely affect the preexisting functionality of network elements. For example, each time switch software is modified, regression testing is performed to assure that the signaling data has not changed between software loads.

In general, signaling data is used to operate and control the elements of a telecommunications circuit to cause it to perform its intended function. Signaling is used to convey information to network elements and provide feedback to the called and calling parties. Such information includes for example, off-hook conditions, service requests, ringing, on-hook conditions, releases, busy signals and dialing.

Conventionally, test engineers use various devices to monitor signaling information. The digital signaling information that is monitored is typically in binary or hexadecimal format. The binary or hexadecimal codes are converted into meaningful messages by manually looking up such codes in a reference book or the like. The decoded messages are then inspected to determine if the signaling data is correct.

Since regression testing typically involves hundreds of test calls which must be completed as quickly and efficiently as possible, much signaling data is not verified using such conventional methods. Instead, test engineers often look for the presence of certain well known bit patterns. If such patterns are present, the other signals are assumed to be correct. Thus, only a small portion of the signaling data is typically verified using conventional methods. Hence, errors which could have been detected early in the development process may not be detected until much later, causing increased expenses and longer delays.

As stated, testing organizations typically perform many iterations of test activities to verify signaling data. The dynamic nature of the development of new services and the time-to-market pressures imposed upon the telecommunications industry, drive the need for timely and efficient test procedures. Additionally, it is desired to create and modify test call procedures in a fast and efficient manner.

Therefore, what is needed is a test call system and process that provides a means for quickly and efficiently creating and modifying test calls and for verifying signaling data in a fast and efficient manner.

SUMMARY OF THE INVENTION

Accordingly the present invention is directed towards a test system and method that automatically tests signaling data in test calls. The test system captures signaling data from the origination and termination sides of test calls that use in band, out-of-band and ISDN signaling techniques. The captured data is saved in a computer file and stored in a computer database for subsequent use. When the test case is subsequently executed, the captured data is retrieved from the database and used to verify signaling data by comparing the captured data from the test call with the previously captured data.

In addition, the present invention provides a means to generate test calls via an intuitive menu-driven computer program. The test case generator of the present invention builds test calls by presenting to a user, a menu for each step in a test call. The user creates test calls by selecting list items and by entering keyboard data where appropriate. In this fashion, test calls are created without needing specialized knowledge of specific languages used by test call execution systems.

BRIEF DESCRIPTION OF THE FIGURES

The present invention will be described with reference to the accompanying drawings, wherein.

In the drawings, like reference numbers generally indicate identical, functionally similar, and/or structurally similar elements. The drawing in which an element first appears is indicated by the leftmost digit(s) in the reference number.

DETAILED DESCRIPTION OF THE PREFERRED EMBODIMENTS

The present invention is directed toward an automated telecommunications test system that generates and executes test calls, and verifies signaling for test calls that use in-band, out-of-band and ISDN signaling techniques.

Figure 1:
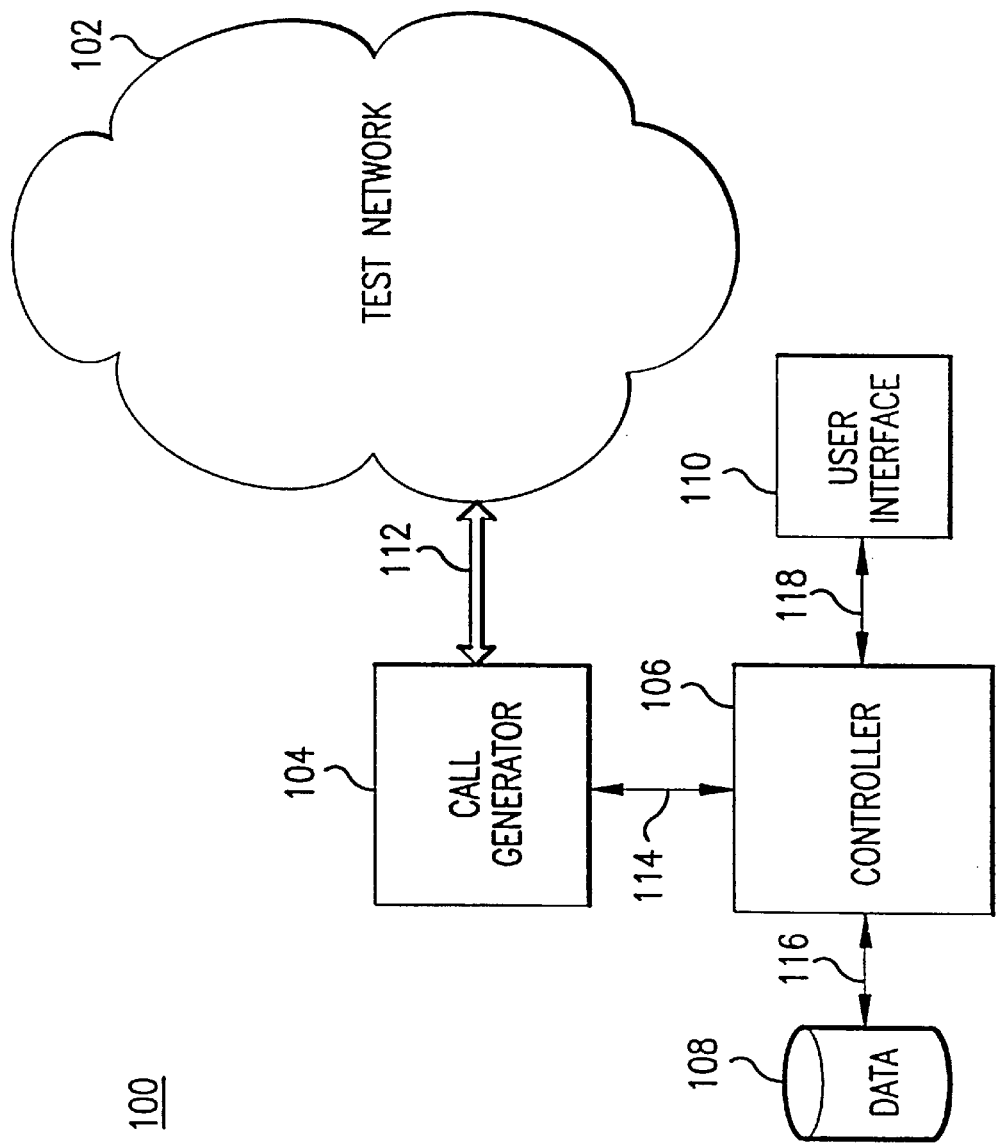
FIG. 1 is a block diagram depicting a preferred embodiment of the present invention in a typical operating environment.

FIG. 1 is a block diagram depicting a preferred embodiment of the present invention in a typical operating environment. The test system 100 depicted in FIG. 1 comprises a controller 106, a user interface 110, a call generator 104, and a database 108. The call generator 104 is coupled with a test network 102 via a bidirectional transmission line 112. The test network 102 typically comprises a plurality of diverse telecommunication components (not shown) such as transmission lines, call switch facilities, digital cross connects and the like, that are identical to or equivalent to the network components forming an actual communications network.

The call generator 104 is directed by the controller 106 to generate test calls from commands within a test call script. The test calls are routed to the test network 102. The controller 106 controls the call generator 104 via the bidirectional control line 114. The controller 106 is operated by test personnel via the user interface 110, which is coupled to the controller with a bidirectional transmission line 118. Typically test calls and test call results are stored in the database 108, which is coupled with the controller 130, via the bidirectional transmission line 116. Test calls may also be created by using the user interface 110. Additionally, test calls are typically created, run and modified via the user interface 110.

As will be described below, the present invention provides a means for automating signaling data testing and for creating suites of automated test calls. Once test calls are automated they can be repeated with minimal effort. This facilitates regression testing by automatically verifying the signaling data between switch software versions. In addition, automated test calls are generally more reliable than manual test calls due to the reduction of human factor errors. Further, automated test systems are more efficient and reliable because they execute test calls repeatedly in exactly the same manner.

In addition, the present invention provides a means for generating automated test calls that can be executed without human interaction. This not only reduces test staff requirements, but enables one to run test calls continuously during the day or night. As described below, in order to achieve unattended operation, the present invention provides a means to automatically verify and detect errors in signaling data.

As stated, signaling data is used to operate and control the elements of a telecommunications network, such as the network 102, and cause such elements to perform their intended functions. In voice communications, signaling data is simulated and carried by all equipment in the transmission path. Signaling is accomplished using either in-band or out-of-band techniques. In-band signaling systems use the voice channel to transmit both voice and signaling information. Out-of-band signaling systems employ separate highspeed digital channels for signaling information.

A third type of signaling is employed for Integrated Services Digital Network (ISDN) services. In general, ISDN services use a separate channel, the 'D' channel, for signaling data. However, the 'D' channel can also be used to carry data up to 9600 bits per second in addition to the control and signaling information. Thus, ISDN is not characterized herein, as either in-band or out-of-band signaling. As described herein, three signaling techniques are identified: in-band; out-of-band (i.e. SS7); and ISDN.

In a digital telecommunication networks, such as the network 102, signaling data is represented in a digital format. However, signaling data is also represented in an analog format within various elements that are coupled with the digital network 102. For example, consider a long distance telephone call originating from a residential telephone circuit and terminating at a private branch exchange (PBX). Further suppose the termination at the PBX is accomplished via a leased dedicated access line (DAL) provided to a subscriber by an interexchange carrier (IXC). In this case, the telephone call is first routed to a local exchange carrier (LEC). From there, the signals comprising the voice and signaling data are translated into a digital format and routed to an IXC switch. The phone call is ultimately routed to the IXC's termination switch that is coupled to the subscriber's DAL, and used to transport the phone call to the PBX.

In this example, the signaling data from the telephone station to the LEC switch is analog in nature, and typically comprises audio signals and/or changes to the electrical characteristics of the telephone connection. Thus, analog signaling is accomplished via audio signals, such as pulse dialing and/or dual tone multi-frequency (DTMF) signals. Signals such as an off-hook condition and ringing are typically accomplished via changes to the line voltages and the like.

Once the call is routed to the IXC, the voice and signaling data are encoded into digital signals. Typically, for out-of-band signaling systems, signaling information is encoded into a digital format and transmitted to all of the equipment in the transmission path via separate highspeed digital transmission lines. In one example, the out-of-band signaling system uses the signaling system 7 (SS7) protocol. For in-band systems the signaling information is encoded and inserted into predefined bit positions along with digitized voice data and transmitted across the voice transmission lines. An example of an encoding technique used for in-band signaling data is subsequently presented herein with reference to FIG. 8.

Thus, while the call is routed within the IXC digital network, all signals including voice and signaling data are represented in a digital format. When the call is finally routed to the IXC's terminating switch, the voice and signaling data are decoded back into the proper analog format which should comply with the interface requirements of the customer's PBX.

Accordingly, to successfully complete the call in the example above, all telecommunication elements coupled between the residential telephone station and the analog PBX must transmit the proper signaling data to all elements in the transmission path. In addition, it should be appreciated that signaling data is also encoded and decoded in a like manner in the opposite direction, that is, from the termination side of the call to the origination side. In addition, a variety of protocols are used for signaling data in both the digital and the analog domains.

For example, a ground start is an analog signaling protocol typically used on subscriber trunks in which one side of a two wire trunk is momentarily grounded to get a dial tone. A loop start is another example of signaling in which a trunk is seized by bridging both wires of a two wire trunk through a particular resistance. Other examples include wink signaling, SS7 digital signaling, and ISDN signaling. In addition, in order for IXCs to interface with LECs, certain standards for switching arrangements referred to as 'Feature groups' are followed. Currently there are four major switching arrangements available, namely, Feature Group A (FGA), Feature Group B (FGB), Feature Group C (FGC) and Feature Group D (FCD).

Thus, when a telecommunication company leases DALs, care must be taken to lease trunks that are specifically configured for the signaling protocols used by their subscriber's equipment. Furthermore, telephone companies must support signaling protocols used by the various network elements that are coupled to their networks. For example IXC networks must support the variety of signaling protocols used by LECs and foreign exchange offices. Thus, even though many signaling protocols are rarely used and/or out-of-date, such protocols must generally still be supported by telecommunications companies. The variety of signaling protocols that are supported by telecommunication companies in the examples below are hereinafter referred to as the 'prevailing signaling protocols'.

Thus, testing organizations should test signaling data for telephone calls that originate from trunks that are configured to use each of the prevailing signaling protocols. Additionally, testing organizations should test signaling data for telephone calls that terminate to trunks that use each of the prevailing signaling protocols. As described below, the present invention provides a means to verify signaling data for test calls that originate and terminate using each of the prevailing signaling protocols.

Figure 2:
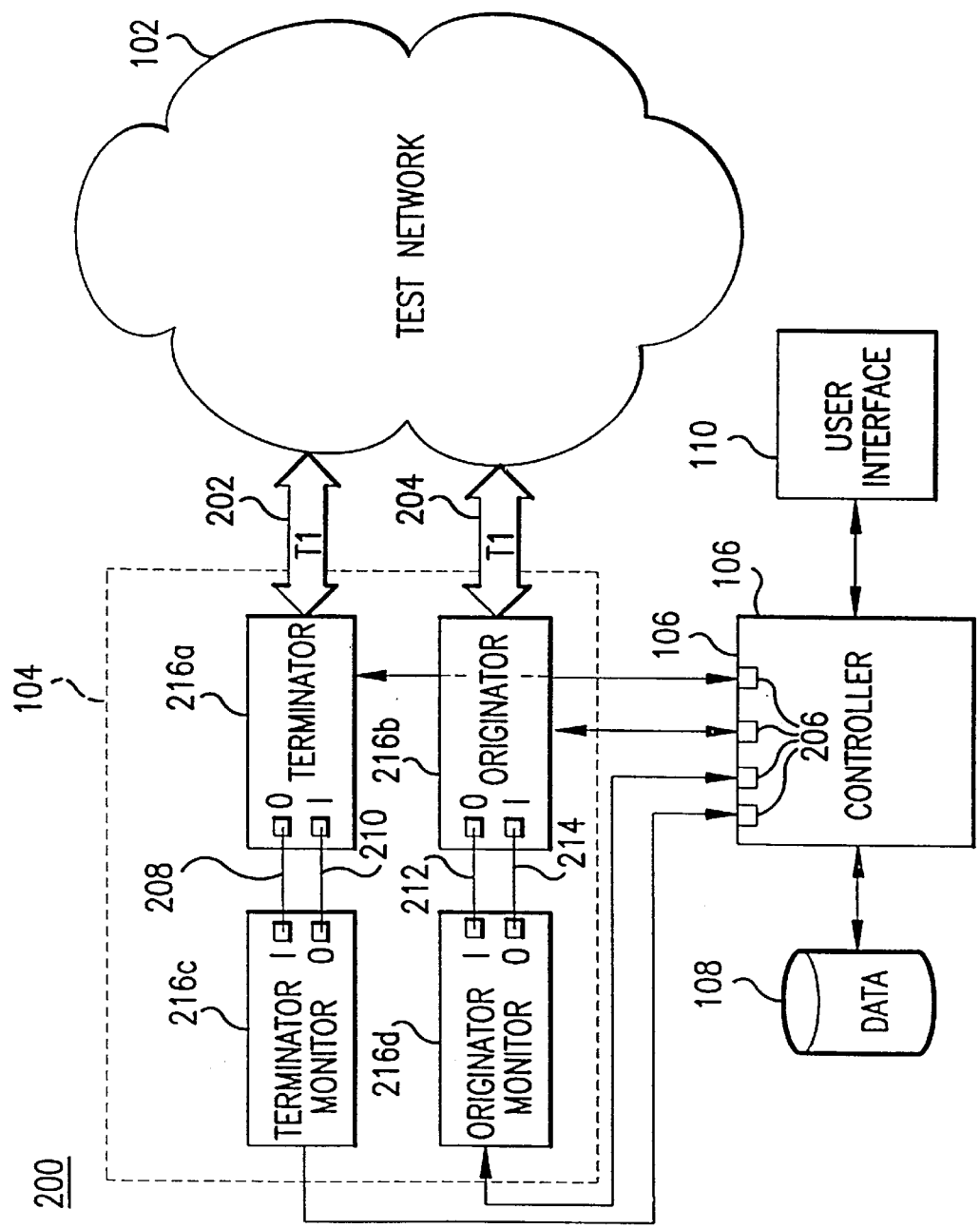
FIG. 2 is a block diagram depicting an in-band signaling test system according to a preferred embodiment of the present invention.

One embodiment of an implementation of the test system 100 is an in-band signaling test system, as depicted in FIG. 2. The in-band test system comprises a controller 106, a database 108, a user interface 110, and a call generator 104. The call generator 104 comprises 4 T1 testing devices 216a, 216b, 216c and 216d (generally 216). In a preferred embodiment of the present invention, the T1 test devices 216 are commercial off-the-shelf (COTS) Sage Instruments 930A Communication Test Sets, manufactured by Sage Instruments. Alternatively, any type of T1 test device can function as the call generator without departing from the principles of the present invention. The T1 test set 216a functions as a call termination device (hereinafter 'terminator'), and the T1 test set 216b functions as a call origination device (hereinafter 'originator'). Thus, a test call that originates from the originator 216b is routed to the test network 102, via the T1 transmission line 204. The test call is 'answered' by the terminator 216a, which receives the call from the test network 102 via the T1 transmission line 202.

Each T1 communications line 202 and 204 has the capacity of approximately 24 voice channels. The T1 test sets 216c and 216d are used to monitor the A and B signaling bits (described below) from the originator 216b and the terminator 216a respectively. The monitoring of the A and B signaling bits is accomplished by configuring the input and output ports of each call generator 216 as depicted by the connectors 208, 210, 212 and 214. Each T1 test set 216 is coupled with the controller 106 via a bidirectional serial connection coupled with each serial port 206. Thus, the controller 206 controls the T1 test sets 216 via the serial connections coupled with the serial ports 206. A record of the monitored bits is maintained by the controller 106. Such record is typically stored in the database 108.

Figure 8:
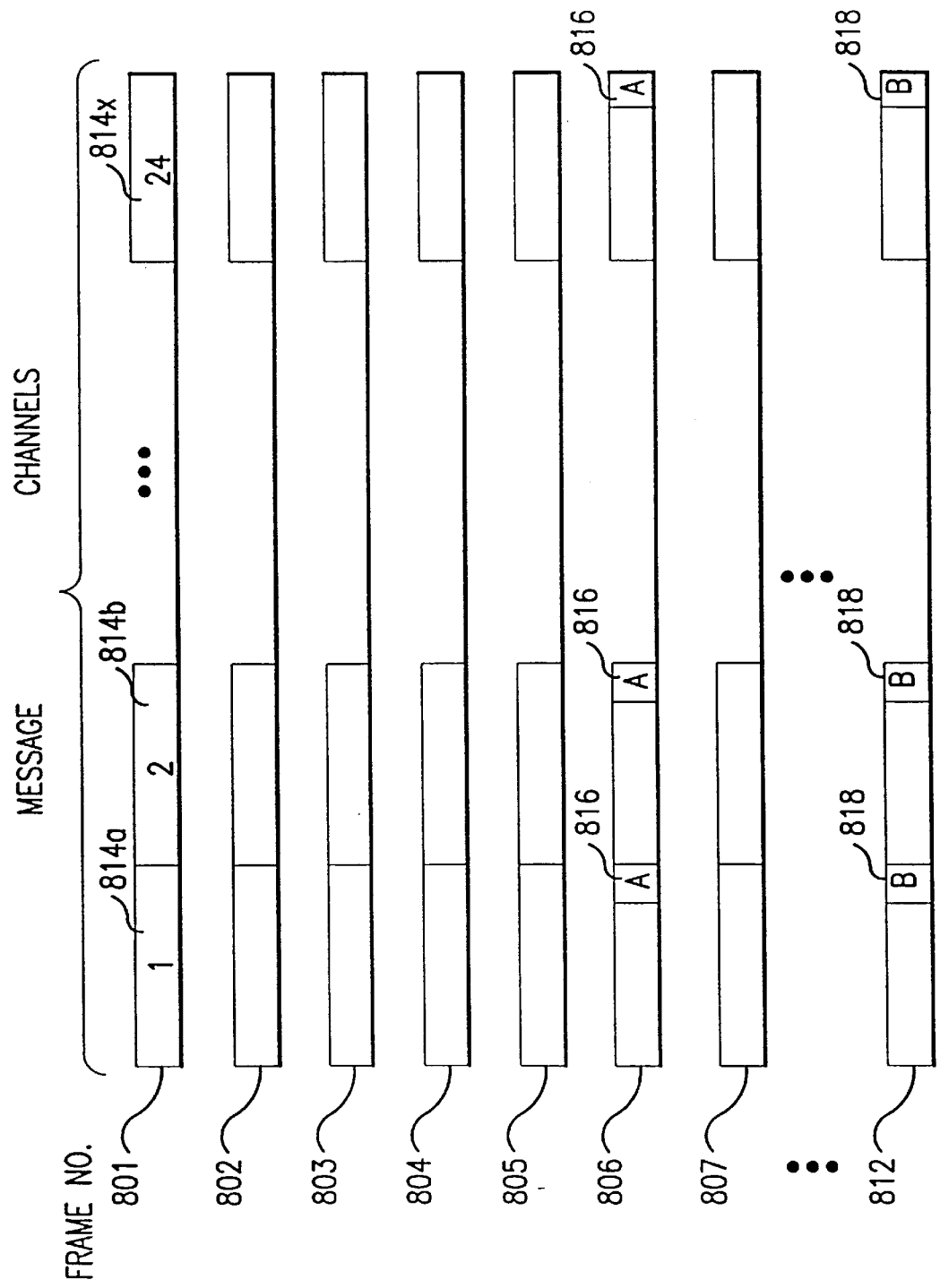
FIG. 8 depicts an example of a technique used to encode signaling data with digitized voice data for an in-band signaling system.

The details of the A and B signaling bits will now be described with reference to FIG. 8. FIG. 8, depicts an example of a technique used to encode signaling data with digitized voice data for an in-band signaling system. This example depicts a twelve frame superframe structure in a standard framing format referred to as 'D-4'. Each of the twelve frames 801, 802, . . . , and 812, comprise 24 message channels, such as the message channels 814a, 814b, . . . , and 814x. Each message channel represents one of the 24 voice channels that comprise a DS-1 signal over a typical T1 digital transmission link.

T1 is a standard for digital transmissions in the United States. Digitization and coding of analog voice signals are typically accomplished using 8,000 samples per second, which is twice the maximum frequency supported by the voice channel. The coding in 8-bit words, such as the 8-bit word 814a, yields a fundamental T1 building block of 64 Kbps. This is referred to as a level 0 signal and is represented by Digital Signal at Level 0 (DS-0). Combining 24 such voice channels into a serial bit stream using time division multiplexing (TDM) is performed on a frame-by-frame basis. A frame such as the frames 801–812, is a sample of all 24 channels (24 channels×8 bits=192 bits), plus a synchronization bit called a framing bit (not shown), which yields a block of 193 bits, such as the block 801. Frames are transmitted at the sampling rate of 8,000 per second, thus creating a 1.544 Mbps (8,000×193=1.544 Mbps) transmission rate. This rate is termed DS-1.

In this example, 8 bits are used for voice in all time slots except for every sixth frame, in which the least significant bit (LSB) is used for signaling. The signaling channels thus derived are divided into an A and B subchannel as depicted by the bits 816 and 818 in the frames 806 and 812, respectively. Each subchannel sends a bit of signaling information every twelfth frame. Hence a 12 bit framing sequence is needed to identify the signaling bits for the two signaling subchannels. With this technique the eighth LSB bit of each 24 8-bit time slot is robbed every sixth frame to convey the signaling information, such as on hook, off-hook, etc., for each voice channel. Hence, this technique is often referred to as 'robbed' digit signaling. The data comprising the A and B subchannels 816 and 818 is an example of the digital signaling data that is verified by the present invention and is referred to herein as the 'A and B signaling bits'.

Referring back to FIG. 2, the transmission lines 202 and 204 each comprise 24 individual voice channels. Typically the channels are individually configured to emulate a particular prevailing signaling protocol. Thus, for example, channel 1 coupled with the originator 216 may be configured for a Feature Group A (FGA), seize DTMF signaling protocol, while channel 2 may be configured for a Feature Group B (FGB), DS1 Wink multi-frequency (MF) signaling protocol. Similarly, channel 3 may be configured for a DAL loop start signaling protocol and channel 4 may be configured for a DAL ground start protocol. Each of the 24 channels on both the originator 216b and the terminator 216a may be configured for any of the prevailing signaling protocols. Note however, that the particular configuration of each channel must match the protocol of the network elements within the network 102 which are attached to the T1 transmission lines 202 and 204.

Accordingly, test calls originating from any of the prevailing signaling protocols can be accomplished by originating the call via a selected channel which is configured for the desired signaling protocol. Likewise, test calls terminating to any of the prevailing signaling protocols can be accomplished by dialing the phone number associated with a selected termination channel that is configured for the desired signaling protocol. Typically, the telephone numbers associated with a particular termination channel is dictated by a network controller database (not shown), the implementation of which would be apparent to those skilled in the relevant art(s).

As stated, in a typical signaling regression test, all of the above combinations are tested. That is, at least one test call is made from each of the configured originator channels to each of the configured termination channels. In this example, a configured channel refers to a channel configured to emulate one of the prevailing signaling protocols.

Figure 3:
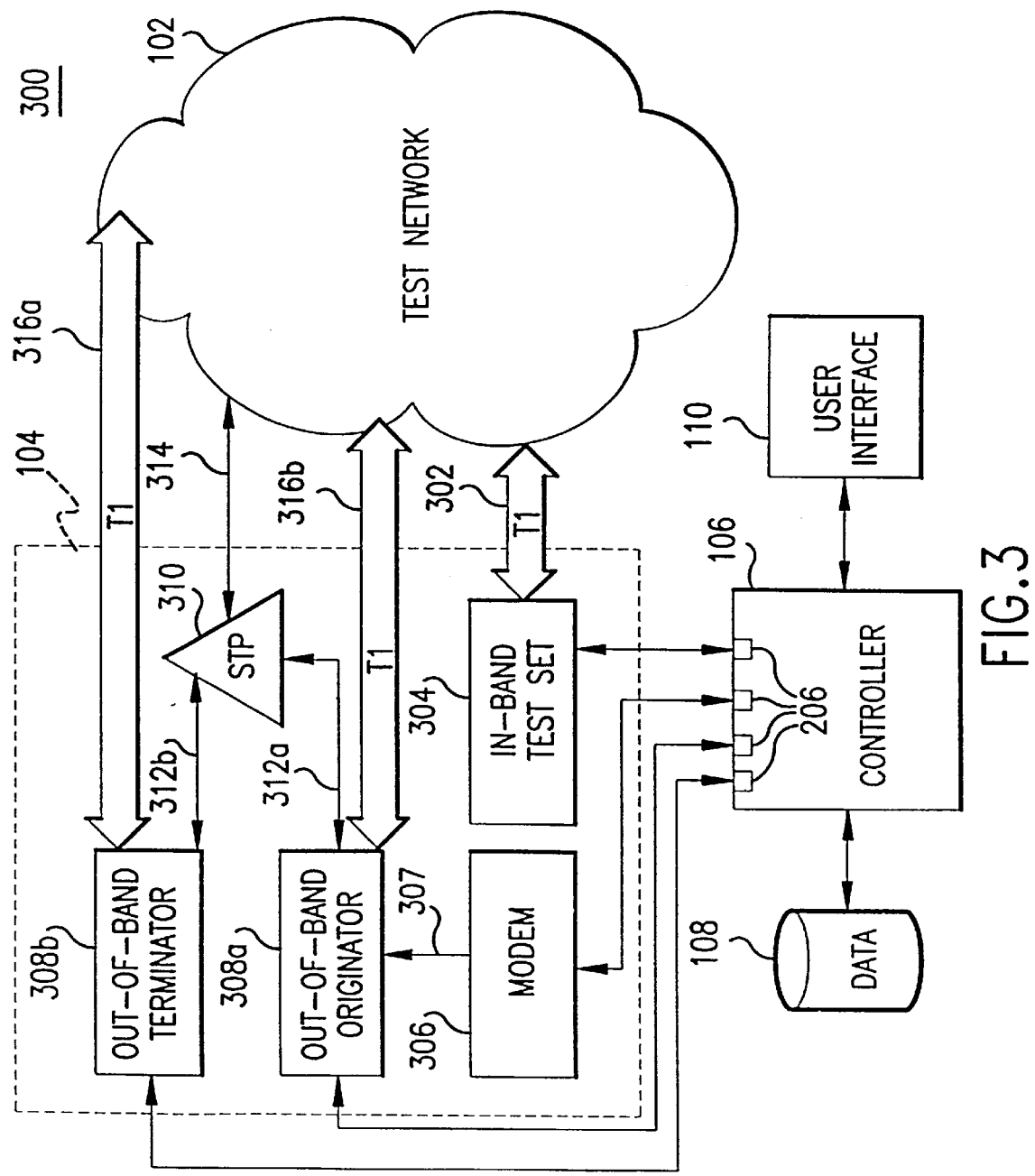
FIG. 3 is a block diagram depicting of an out-of-band/ISDN signaling test system according to a preferred embodiment of the present invention.

Another implementation of a preferred embodiment of the test system 100 is an out-of-band signaling test system as depicted in FIG. 3. The out-of-band signaling test system comprises a controller 106, a database 108, a user interface 110 and a call generator 104. The call generator 104 comprises an in-band test set 304, a modem 306, a pair of out-of-band test sets 308a and 308b, and a signaling transfer point 310.

The signaling transfer point (STP) 310 is coupled with the test network 102 via a high speed bidirectional transmission line 314. Each out-of-band test set 308a and 308b is coupled with the STP 310 via bidirectional highspeed transmission lines 312a and 312b, respectively. In addition each out-of-band test set 308a and 308b is coupled with the test network 102 via bidirectional T1 transmission lines 318a and 318b, respectively.

The in-band test set 304 is coupled with the test network 102 via a bidirectional T1 transmission line 302. The in-band test set 304, the modem 306, the out-of-band test set 308a and the out-of-band test set 308b are each coupled with the controller 106 via a bidirectional serial connection coupled with a serial port 206.

In this example, as in a preferred embodiment of the present invention, the in-band test device 304 is an COTS Sage Instruments 930A Communication test set, manufactured by Sage Instruments. The out-of-band test sets 308 are IDACOM protocol analyzers, manufactured by Hewlett Packard. Alternatively, any type test system can be used without departing from the principles of the present invention.

The out-of-band test set 308b functions as a call termination device (hereinafter 'terminator'), and the out-of-band test set 308a functions as a call origination device (hereinafter 'originator'). In this example, test call signals originate from the originator 308a. From there high speed digital SS7 signaling data is transmitted to the STP 310 via the transmission line 312b. The STP 310 functions to transfer the signaling data directly to appropriate network elements within the test network 102, via the transmission line 314. Note that the STP 310 is a well known, common element that is used for out-of-band signaling in a similar manner as described herein. The out-of-band terminator 308b receives the signal back from the network 102, via the transmission line 314, the STP 310b and the transmission line 312b.

Similarly, the originator 308a may orignate ISDN test calls via the T1 transmission line 316b. Such calls are routed through the test network 102 and terminate at the terminator 308b, via the T1 transmission line 316b. The modem 306 is used to send DTMF signals to the out-of-band originator 308a, when for example, testing services such as credit card calls which require such DTMF signals. For example, the controller 206 uses the originator 308a to set up an ISDN call. Then, after the call has been established, the controller 206 sends a command to the modem 306 to outpulse specified DTMF digits. The modem 306, which is coupled to the originator 308a, via the transmission line 307, outpulses the specified digits.

In addition to test call generation, the out-of-band test sets 308 function to monitor the out-of-band and ISDN signaling bits that are sent and received by each test set 308. The controller 206 captures such signaling bits and records them for test call verification. This is typically accomplished by creating a computer file which is stored in the database 108.

The in-band test set 304 is used as either a terminator or an originator for test calls. If the in-band test set 304 functions as an originator that the out-of-band terminator 308b is used to terminate that particular test call. Similarly, if the in-band test set 304 functions as a terminator, then the out-of-band originator 308a is used to orignate that particular test call. In either case, the out-of-band signaling bits are monitored by the particular out-of-band test set 308 that is used for each test call. Thus, using the out-of-band test system 300, test calls can originate and terminate using either in-band, out-of-band or ISDN trunks. Note that in this example, the in-band A and B signaling bits are not being monitored by the out-of-band test system 300. However, another In-band test set 304 can be set-up as a monitor and used in a similar fashion as described in FIG. 2 (specifically 216c and 216d), if such monitoring capabilities are desired.

Thus, by using the configuration depicted in FIG. 3, test calls can be made that originate using in-band trunks and terminate using either out-of-band or ISDN trunks. Similarly test calls can be made that originate using out-of-band trunks and terminate using either out-of-band, in-band or ISDN trunks. Additionally, test calls can be made that originate using ISDN trunks and terminate using either in-band, out-of-band or ISDN trunks.

As stated, the present invention provides a means to generate test calls via an intuitive menu-driven computer program. The test case generator of the present invention builds test calls by presenting a menu for each step in a test call. A user creates test calls by selecting list items and by entering keyboard data where appropriate. In this fashion, test calls are created without the need for specialized knowledge pertaining to specific languages used by test call execution systems, such as the controller 206.

Often during a formalized test, new test calls need to be created and/or existing test calls need to be modified. The present invention speeds up this process by alleviating the need to manually create test call scripts using an ASCII editor or the like. Further, as stated, the present invention alleviates the need for test call authors to be familiar with the often cryptic and non-intuitive language and syntax of test call execution systems, such as the controller 106.

Figure 6:
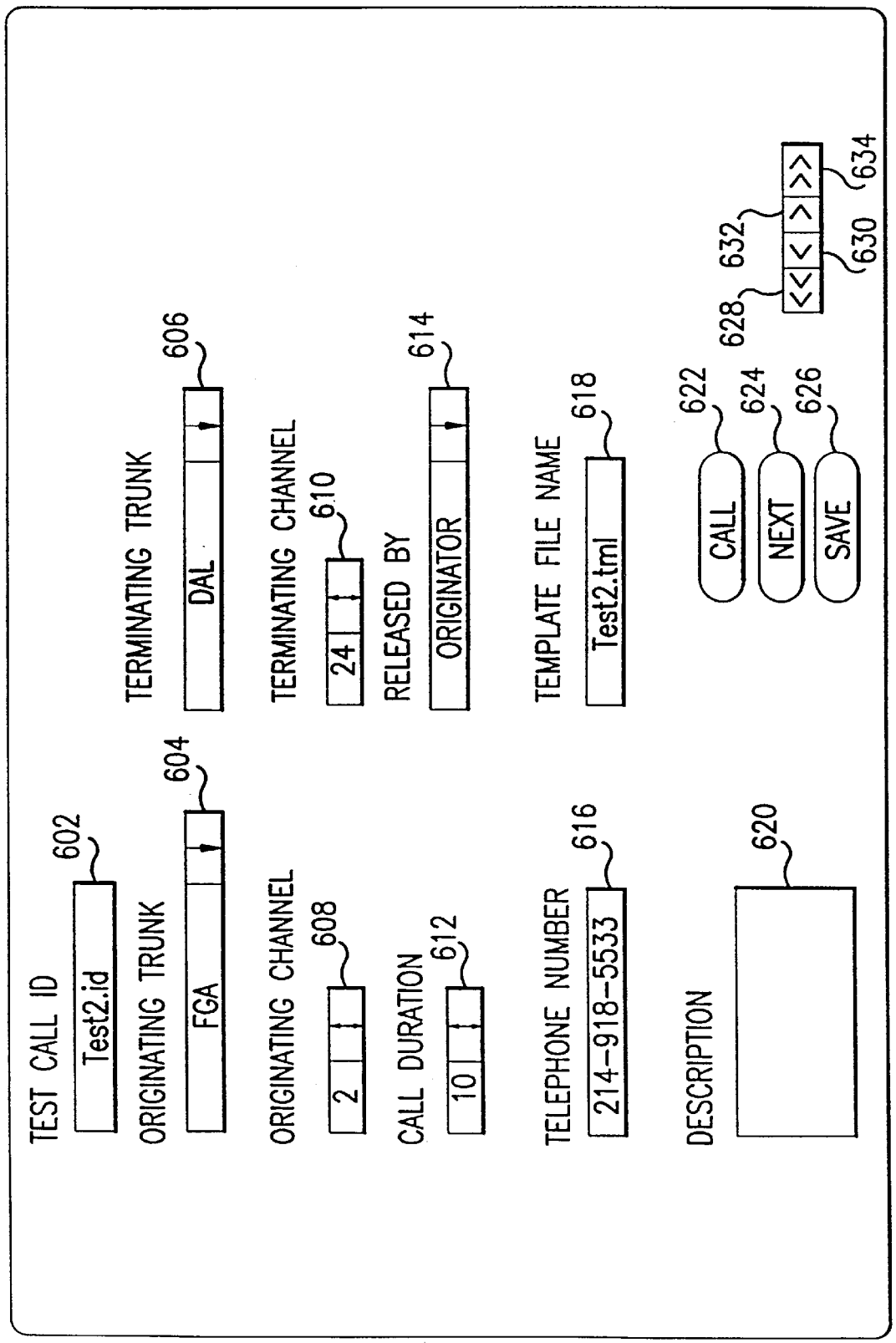
FIG. 6 is an example of a test call generation screen that can be used to implement the test case generator according to the present invention.

FIG. 6 depicts an example of a test call generation screen that can be used to implement the test case generator according to the present invention. The test case generator presents to the user, a plurality of user controls in which the user builds and/or edits a test call by selecting items and/or entering data, via the user controls. In this example, the user controls depicted are entry fields 602, 620 and 618, drop down list boxes 604 and 606, spin entry fields 608 and 610, and push buttons 622, 624, 626, 626, 630, 632 and 634.

Figure 5:
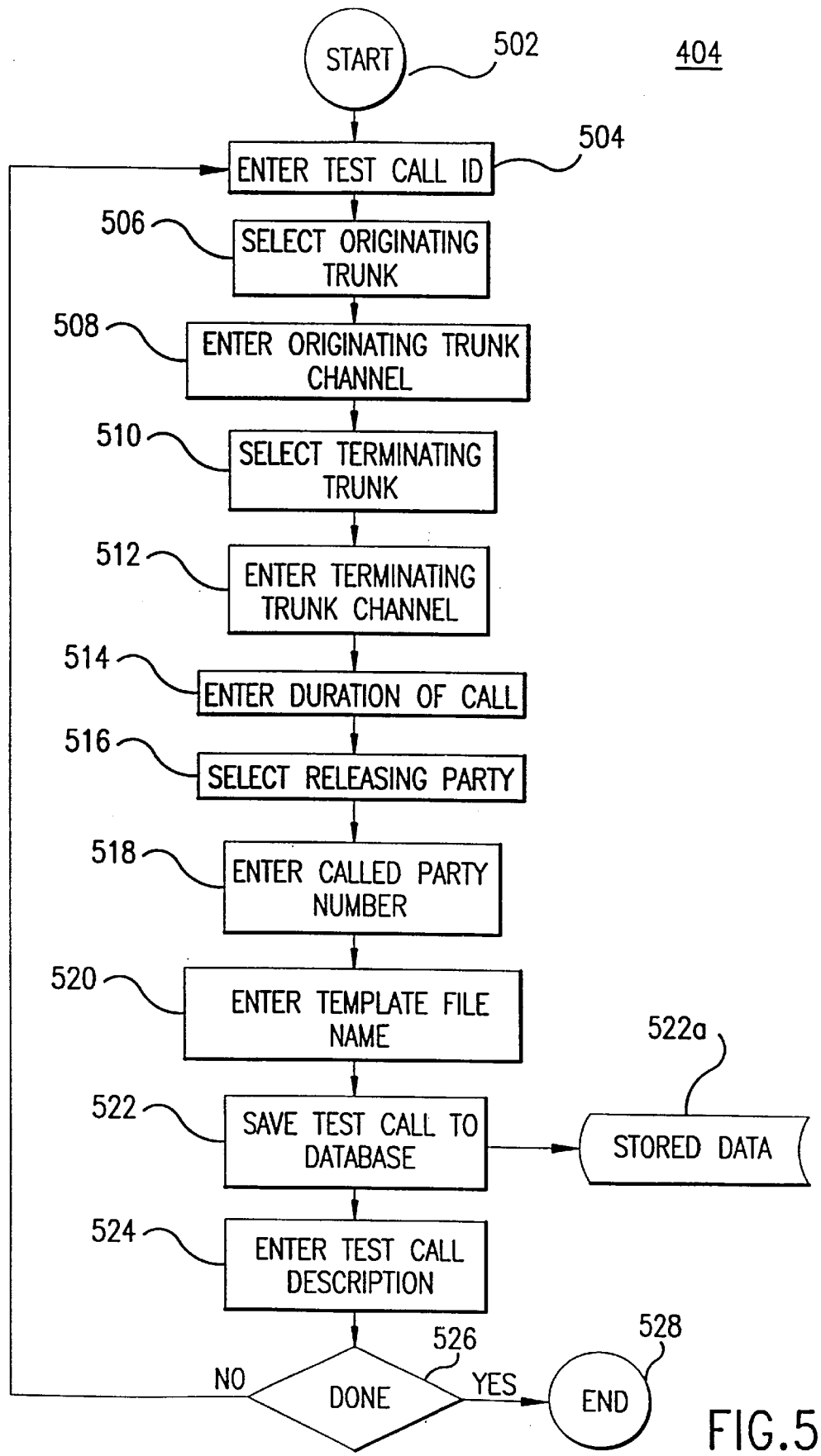
FIG. 5 is a flowchart of a process to build a typical test case using the test call generator according to a preferred embodiment of the present invention.

A process to build a typical test case using the test call generator screen 600, will now be described with reference to the flowchart in FIG. 5. The process begins with step 502 where control immediately passes to step 504. In step 504 the user enters an identification for the test call being generated. Typically a test call file name is entered into the entry filed 602. Next in step 506, the user selects an originating trunk. Typically an originating trunk is selected by clicking on the arrow within the drop down list box 604. Clicking on the arrow in the drop down list box 604 causes a list to be displayed (not shown). The user then selects an originating trunk from the list of available originating trunks.

The list of originating trunks depends on the configuration of the test network 102 and the test call generator 104. Typically, as stated, a selection of a trunk type defines one of the prevailing signaling protocols. Examples of the type of selections a user may choose in the drop down list box 604 include such selections as a FGA, FGB, FGC, FGD, Loop Start DAL, Ground Start DAL, SS7, or ISDN.

Next in step 508, the user selects an originating channel. This is typically accomplished either by selecting a channel (generally from 1–24, as previously described), via the up/down arrow on the spin box entry field 608, or by entering a number (from 1–24) directly into the entry field 608. The particular channel selected depends upon the configuration of the test network 102. For example, if a user wants to originate a test call from a FGA trunk, as depicted in FIG. 6, the user should select the proper channel number that is configured by the test network 104 to receive signaling data from a FGA trunk. During the execution of this test call, the test call controller 206, controls the test call generator 104, such that selected trunk type 602 is simulated on the selected channel 608.

In step 510, the terminating trunk type is specified via the drop down list box 606, in a similar fashion as described for the originating trunk type in step 506. Next in step 512, a terminating trunk channel is selected via the spin box entry field 610 in a similar fashion as described for the originating trunk channel in step 508. Note that the same constraints for selecting the terminating trunk channel exists as described above for the originating trunk channel.

In step 514 the user enters the duration of the call using the spin box entry field 612. This is typically used to verify billing records which should agree with the duration of the test call selected in step 514. Next in step 516, the user selects which party, the originator or the terminator, releases the test call, via the drop down list box 614. In step 518, the user enters the called party telephone number, via the telephone number entry field 616. The telephone number entered in step 518 depends on the configuration of the test network 102. Typically, a network control database (not shown) is used to assign telephone numbers to particular channels within particular trunks that terminate at particular termination switches. All of the telephone numbers in this example, will correspond to the particular termination switch (not shown) that is attached to the T1 transmission line coupled with the termination device of the test system. Thus, the telephone number entered in step 518 causes the test call to be routed through the test network 102 to the proper termination channel, as defined by steps 510 and 512.

Next, in step 520, the user enters the name of the signaling template data file via the entry field 618. As stated, the call generator 104 captures signaling data during test calls. The first time a test call is executed, a signaling data template is created. The signaling data template generally comprises signaling data from the originating and terminating sides of the test call. Typically, when a test call is first executed by the controller 106, if the signaling data template file is not found in the database 108, then the collected signals for the test call are saved as a template in the database 108, with the file name specified in the entry field 618. This template is typically examined by a test engineer. If the signaling data contained in the template is correct, that is if no errors exist in the signaling data, than the template is used to verify signaling data for subsequent executions of the test call.

Next, control passes to step 522. In step 522, the test case is saved to the database 108 as shown by the stored data 522a. This is typically accomplished by the user clicking on the save push button 626. Next, control passes to step 524. In step 524, the user may enter a description for the test case in the description entry field 620. In step 526, the user has the option of creating another test call in which case control passes to step 504. If the user does not wish to enter another test case, the process ends with step 528.

In addition, the user has the option to view other test calls via the control buttons 628, 630, 632 and 634. By using these control buttons, the user may browse through previously written test calls. For example, by clicking on the forward button 632, the next test call listed in the database index is displayed. By clicking on the first button 628, the first test call listed in the test call data base index is displayed. Likewise, by clicking on the last button 634, the last test call listed in the test call database index is displayed. Finally by clicking on the back button 630, the previous test call listed in the test call database index is displayed. The user may also execute a test case by selecting the call button 622.

The controller 206 transforms the data from the test call generator screen 600 into an executable test call. Each data field is read by the controller 206 and translated into an appropriate line or lines in a test case script that is interpreted by the test call generator 104. Thus, the specific implementation of the translation process from the test call generator screen 600 into a test call script, depends on the specific implementation of the call generator of the present invention. For example, if the test system is configured as depicted by FIG. 2, and multiple SAGE 930A devices are used the test call generator 104, then the contents of the test case script is constrained by the control language of the SAGE 930A devices. Likewise if the test system is configured as depicted by FIG. 3, where multiple IDACOM devices, SAGE 930A devices and Modems are used as the test call generator 104, then the contents of the test case script is constrained by control languages of the SAGE 930A devices, the IDACOM devices and modem devices. In any case, specific implementations of such translation processess as described above, will be apparent to those skilled in the relevant art(s).

Figure 4:
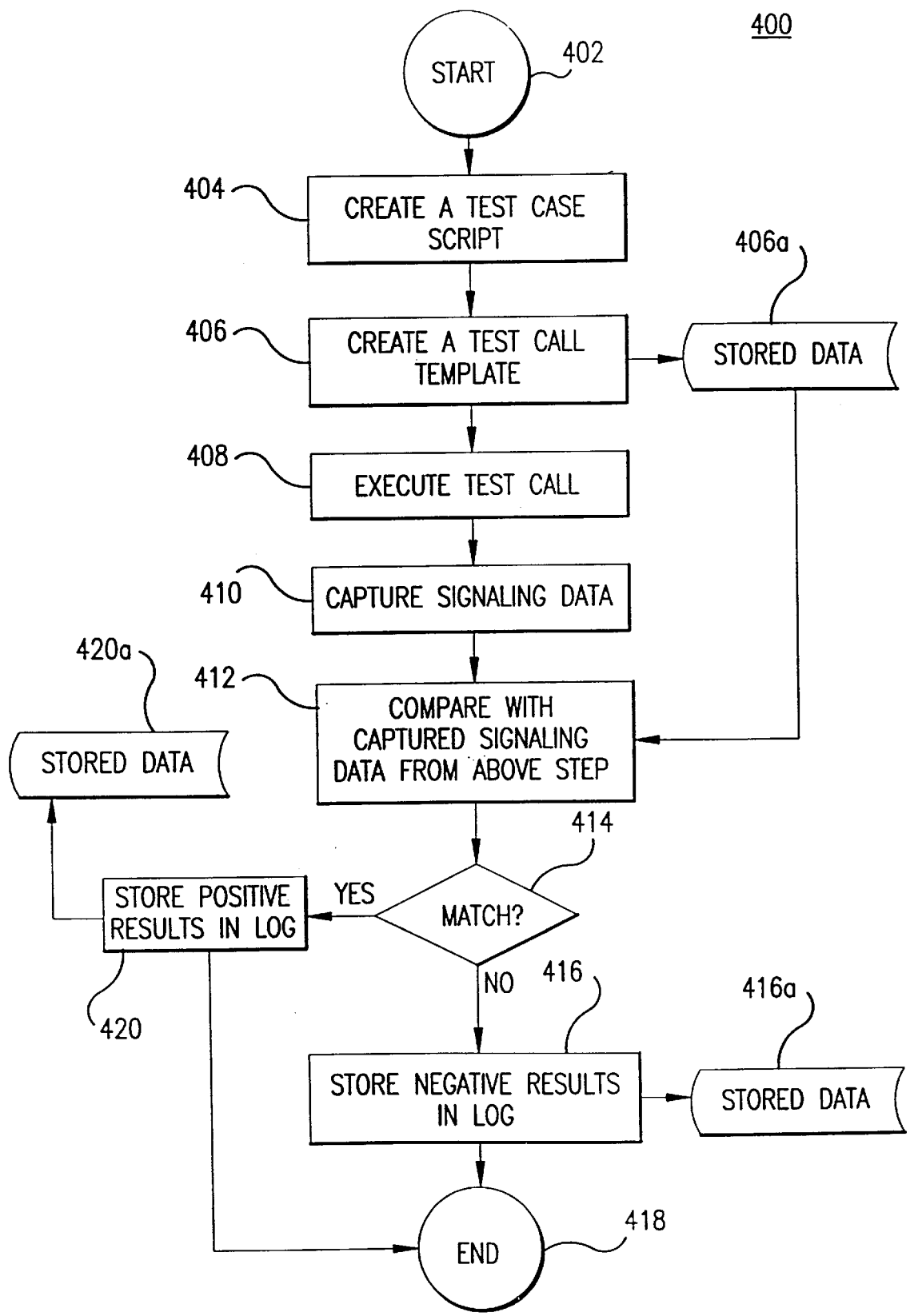
FIG. 4 is a flowchart of a process that can be used for a test call according to a preferred embodiment of the present invention.

A test call process that can be used with the present invention will now be described with reference to the flowchart in FIG. 4. The process begins with step 402 where control immediately passes to step 404. In step 404 a user creates a test call script to be executed by the controller 106. For example, the process of FIG. 5, as previously described can be used to create the test call script. In step 406, a test call template is created, as previously described. Once the test call template has been visually verified, it is stored in the database 108, as shown by the stored data 406a.

In step 408 the test call is executed. This is typically accomplished via the user interface 110, as previously stated. In step 410, the signaling data associated with the test call executed in step 408 is captured. As previously described herein, signaling data is captured by the test call generator device 104 and recorded by the controller 106. The captured data may be stored as a computer data file and stored in the database 108.

In step 412, the captured data from step 410 is compared with the test call template that was created in step 406. This may be accomplished by comparing the data file from step 410 with the template file created in step 406. In step 414 the process determines if the signaling data matches the template data. If a match exists then the test call has passed and control passes to step 420, where the positive results are stored in the database 108, as shown by the stored data 420a. If a match does not exist then the test call has failed and the negative results are stored in the database 108, as shown by the stored data 416a. In this fashion, errors in signaling data are automatically detected and the correct operation of signaling data is automatically verified. In either case, the process ends with step 418.

Figure 7:
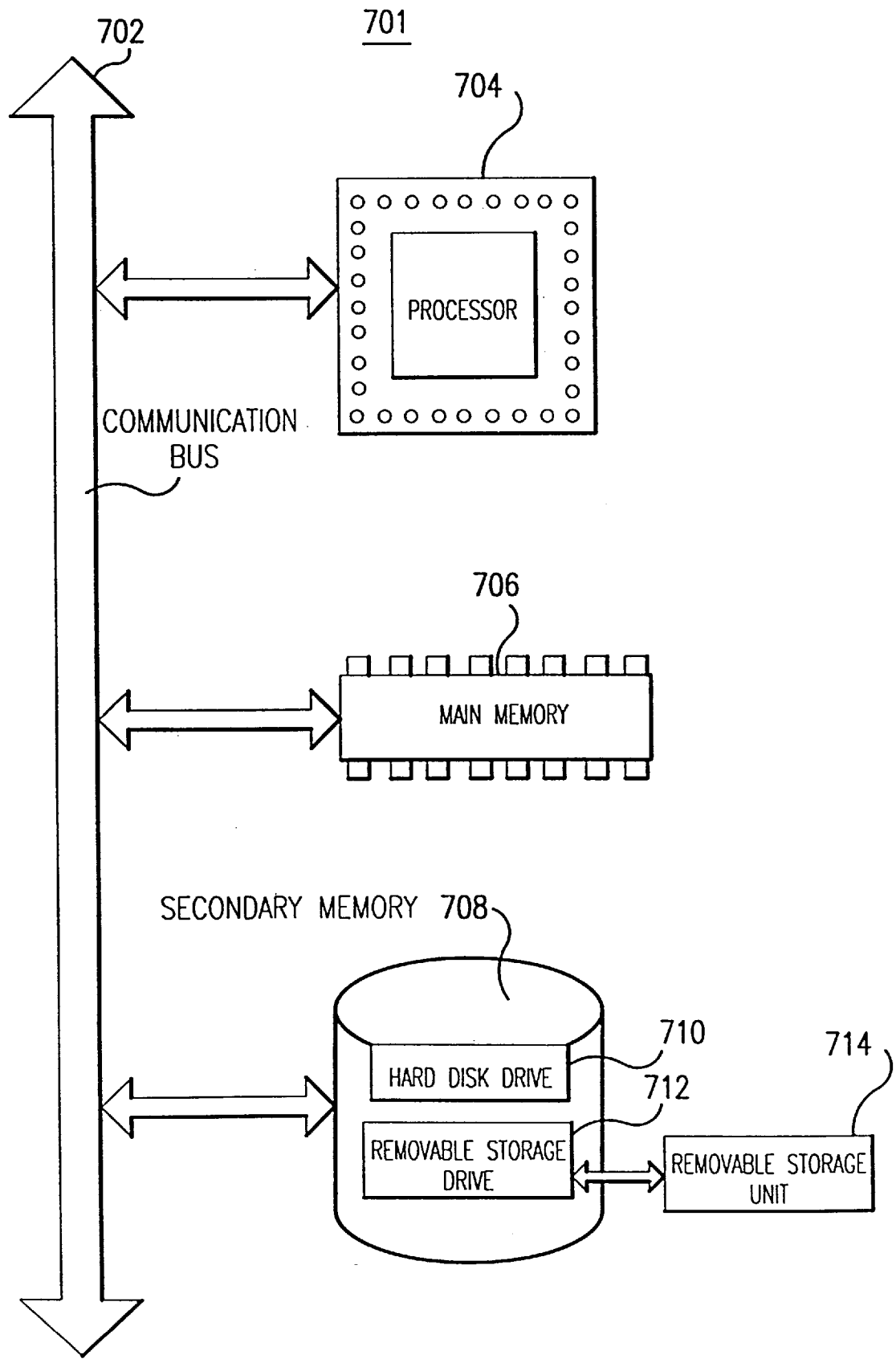
FIG. 7 is a block diagram of a computer system useful for implementing components of a preferred embodiment of the present invention.

In one embodiment, the present invention may be embodied in a general computer system. An exemplary computer system 701 is shown in FIG. 7. The computer system 701 includes one or more processors, such as processor 704. The processor 704 is connected to a communication bus 702.

The computer system 701 also includes main memory 706, preferably random access memory (RAM), and a secondary memory 708. The secondary memory 708 includes, for example, a hard disk drive 710 and/or a removable storage drive 712, representing a floppy disk drive, a magnetic tape drive, a compact disk drive, etc. The removable storage drive 712 reads from and/or writes to a removable storage unit 714 in a well known manner.

Removable storage unit 714, also called a program storage device or a computer program product, represents a floppy disk, magnetic tape, compact disk, etc. As will be appreciated, the removable storage unit 714 includes a computer usable storage medium having stored therein computer software and/or data.

Computer programs (also called controllers) are stored in main memory and/or the secondary memory 708. Such computer programs, when executed, enable the computer system 701 to perform the features of the present invention discussed herein. In particular, the computer programs, when executed enable the processor 704 to perform the features of the present invention. Accordingly, such computer programs represent controllers of the computer system 701.

In another embodiment, the invention is directed to a computer program product comprising a computer readable medium having control logic (computer software) stored therein. The control logic, when executed by processor 704, causes the processor 704 to perform the functions of the invention as described herein.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. An automated test call system, coupled with a telecommunications network, comprising:
   a controller;
   a call generator coupled with said controller comprising:
      a first in-band test set, coupled between the telecommunications network and the controller, configured to function as a test call originator
      a second in-band test set, coupled between said test call originator and said controller, configured to monitor the signaling bits of said test call originator;
      a third in-band test set, coupled between the telecommunications network and said controller, configured to function as a test call terminator; and
      a fourth in-band test set, coupled between said call terminator and said controller, configured to monitor the signaling bits of said terminator;
   a database coupled to said controller; and
   a user interface coupled to said controller.

2. The automated test system of claim 1, wherein the input port of said first in-band test set is coupled with the output port of said second inband-test set, and the output port of said first in-band test set is coupled with said input port of said second in-band test set.

3. The automated test system of claim 1, wherein the input port of said third in-band test set is coupled with the output port of said fourth inband-test set, and the output port of said third in-band test set is coupled with said input port of said fourth in-band test set.

4. An automated test call system, coupled with a telecommunications network, comprising:
   a controller;
   a call generator coupled with said controller comprising:
      a first out-of-band protocol analyzer, coupled between the test network and said controller, configured to monitor test call signaling data and to originate test calls;
      a second out-of-band protocol analyzer, coupled between the test network and the controller, configured to monitor test call signaling data and to terminate test calls;
      a signal transfer point coupled to the test network, said first out-of-band protocol analyzer and second out-of-band protocol analyzer;
   a database coupled to said controller; and
   a user interface coupled to said controller.

5. The automated test call system of claim 4, further comprising:
   an in-band test set, coupled between the telecommunications network and said controller and capable of functioning as either a test call originator or terminator.

6. The automated test call system of claim 4, further comprising a modem coupled between said controller and said first out-of-band protocol analyzer.

7. A method for testing signaling data for telephone calls connected to a telecommunications network, comprising the steps of:
   (1) creating a test call script including the steps of:
      (a) executing a test call generation program;
      (b) defining each test call parameter by either selecting an item from a pre-defined list or by entering data into a test call parameter data entry field, said defining step including the steps of:
         (I) identifying an originating trunk;
         (ii) identifying a terminating trunk;
         (iii) identifying a called party telephone number; and
         (iv) identifying a signaling template; and
      (c) saving the test call script;
   (2) creating a test call template comprising the steps of:
      (a) executing the test call script to begin a benchmark test call;
      (b) capturing signaling data from the benchmark test call;
      (c) saving the signaling data captured from the benchmark test call to a computer data file to create a test call template;
   (3) executing the test call script to begin a diagnostic test call;
   (4) capturing signaling data from the diagnostic test call;
   (5) comparing the signaling data from the diagnostic test call with signaling data from the test call template; and
   (6) reporting the results from said comparing step.

8. The method of claim 7, whereby step (1) (b) further comprises:

(i) entering an identification for the test call script;

(ii) identifying an originating trunk channel; and (iv) identifying a terminating trunk channel.

9. A computer program-product including a computer useable medium having computer program logic stored therein, said computer program logic for creating a test call script to be executed by a controller coupled with a call generator, wherein said call generator is driven by pre-defined commands sent by the controller, and comprises first and second in-band test sets for monitoring and originating test calls, and second and third in-band test sets for monitoring and terminating test calls, wherein said computer program logic comprises:

presenting means for enabling the computer to present to a user, a test call generation screen, whereby the user is prompted to enter each test call parameter by either selecting a list item from a predefined list of test call parameters or by entering data into a test call parameter entry field; and translating means for enabling the computer to translate the test call parameters from said presenting means into a test case script comprising a list of pre-defined commands for the call generator.

10. The computer program-product of claim 9, wherein said translating means comprises:

reading means for enabling the computer to read a test call parameter from the list of test call parameters entered from said presenting means; and (b) converting means for enabling the computer to convert the test call parameter from said reading means into at least one pre-defined command for the test call generator.

11. A computer program-product comprising a computer useable medium having computer program logic stored therein, said computer program logic for enabling a computer to test signaling data for telephone calls connected to a telecommunications network, wherein said computer program logic comprises:

(1) test call script creation means for enabling the computer to create a test call script, said test call script creation means including:

(a) first execution means for enabling the computer to execute a test call generation program;

(b) input means for enabling the computer to accept test call parameters from a user by presenting selectable predefined list items or data entry fields, so that the user can specify test call parameters including:
an originating trunk;
a terminating trunk;
a called party telephone number; and
a signaling template; and (c) first storage means for enabling the computer to save the test call script;

(2) test call template creation means for enabling the computer to create a test call template, said test call template creation means including:

(a) second execution means for enabling the computer to execute the test call script created by said test call script creation means;

(b) first capture means for enabling the computer to capture signaling data from the test call executed by said second execution means;

(c) second storage means for enabling the computer to save the signaling data from said first capture means;

(3) means for enabling the computer to execute the test call script created by said test call script creation means to begin a test call;

(4) second capture means for enabling the computer to capture signaling data from the test call;

(5) compare means for enabling the computer to compare the signaling data from said second capture means with the signaling data from said first capture means; and (6) means for enabling the computer to report results from said compare means.

12. The computer program-product of claim 11, wherein said input means further comprises:

means for enabling the computer to accept input from a user to provide a name for the test call script;

means for enabling the computer to accept input from a user to select an originating trunk channel; and means for enabling the computer to accept input from a user to select a terminating trunk channel.

13. A method for creating a test call script to be executed by a controller coupled with a call generator that is driven by pre-defined commands sent by the controller, said call generator comprising a first out-of-band protocol analyzer for monitoring signaling data and originating test calls, and a second out-of-band protocol analyzer for monitoring signaling data and terminating test calls, said method comprising the steps of:

presenting to a user a test call generation screen, wherein the user is prompted to enter each test call parameter by either selecting a list item from a predefined list of test call parameters or by entering data into a test call parameter entry field; and translating the test call parameters from said presenting step into a test case script comprising a list of pre-defined commands for the call generator.

14. The method of claim 13, wherein said translating step comprises the steps of:

reading a test call parameter entered from said presenting step; and converting the test call parameter from said reading step into a pre-defined command for the test call generator.

\* \* \* \* \*